(12) United States Patent
Nawrocki

(10) Patent No.: US 9,825,413 B2
(45) Date of Patent: Nov. 21, 2017

(54) SECURITY CABLE

(71) Applicant: Piotr Nawrocki, Inowroclaw (PL)

(72) Inventor: Piotr Nawrocki, Inowroclaw (PL)

(*) Notice: Subject to any disclaimer, the term of this patent is extended or adjusted under 35 U.S.C. 154(b) by 0 days.

(21) Appl. No.: 14/571,205

(22) Filed: Dec. 15, 2014

(65) Prior Publication Data
US 2016/0172805 A1 Jun. 16, 2016

(51) Int. Cl.
*H01B 11/12* (2006.01)
*H01R 25/00* (2006.01)
*H01R 24/38* (2011.01)
*H01B 1/04* (2006.01)
*H01R 103/00* (2006.01)
*C01B 31/04* (2006.01)
*B82Y 30/00* (2011.01)

(52) U.S. Cl.
CPC .............. *H01R 25/00* (2013.01); *H01B 1/04* (2013.01); *H01R 24/38* (2013.01); *B82Y 30/00* (2013.01); *C01B 31/0438* (2013.01); *H01B 11/12* (2013.01); *H01R 2103/00* (2013.01)

(58) Field of Classification Search
USPC .......................................... 385/92; 174/74 R
See application file for complete search history.

(56) References Cited

U.S. PATENT DOCUMENTS

| | | | | |
|---|---|---|---|---|
| 5,619,604 A * | 4/1997 | Shiflett | G02B 6/3869 | 385/52 |
| D547,270 S * | 7/2007 | Brookmire | D13/133 | |
| 8,563,865 B2 * | 10/2013 | Nair | H01B 7/0876 | 174/113 R |
| 8,937,254 B2 * | 1/2015 | Wen | B64C 3/185 | 174/113 R |
| 9,144,962 B2 * | 9/2015 | Lee | B32B 9/007 | |
| 2002/0019175 A1* | 2/2002 | Higuchi | H01R 13/6275 | 439/680 |
| 2002/0085968 A1* | 7/2002 | Smalley | B01J 19/081 | 428/367 |
| 2004/0020681 A1* | 2/2004 | Hjortstam | B82Y 30/00 | 174/102 SC |
| 2004/0184748 A1* | 9/2004 | Clatanoff | G02B 6/4436 | 385/113 |
| 2004/0222012 A1* | 11/2004 | Wlos | H01B 7/1825 | 174/128.1 |
| 2005/0220393 A1* | 10/2005 | Riester | G02B 6/4201 | 385/15 |
| 2006/0021786 A1* | 2/2006 | Fetterolf | H01B 9/02 | 174/113 R |
| 2006/0072880 A1* | 4/2006 | Cheng | G02B 6/4292 | 385/88 |
| 2007/0201227 A1* | 8/2007 | Camp | G02B 6/0033 | 362/253 |

(Continued)

*Primary Examiner* — William H Mayo, III
*Assistant Examiner* — Krystal Robinson
(74) *Attorney, Agent, or Firm* — Masuvalley & Partners

(57) ABSTRACT

A signal cable for transmitting the signal between a transmitter (5) and a receiver (6), wherein the first plug (1) is intended for connection to the signal transmitter (5), and the second plug (2) is intended for connection to the signal receiver (6), and is electrically connected by a connecting portion, wherein the connecting portion includes a graphene layer (4) disposed on a polymer layer, which graphene layer (4) provides an electrical connection between the first plug (1) and the second plug (2).

3 Claims, 3 Drawing Sheets

(56) References Cited

U.S. PATENT DOCUMENTS

| | | | | |
|---|---|---|---|---|
| 2007/0284557 A1* | 12/2007 | Gruner | B82Y 30/00 252/500 |
| 2010/0033263 A1* | 2/2010 | Baik | B82Y 10/00 333/100 |
| 2010/0080517 A1* | 4/2010 | Cline | G02B 6/3869 385/92 |
| 2010/0105834 A1* | 4/2010 | Tour | B82Y 30/00 525/50 |
| 2010/0303424 A1* | 12/2010 | Furuyama | G02B 6/4201 385/92 |
| 2011/0017587 A1* | 1/2011 | Zhamu | B82Y 30/00 204/157.62 |
| 2011/0073799 A1* | 3/2011 | Magni | B82Y 30/00 252/75 |
| 2011/0184115 A1* | 7/2011 | Debras | B82Y 30/00 524/502 |
| 2011/0204297 A1* | 8/2011 | Park | H01B 1/24 252/503 |
| 2012/0070612 A1* | 3/2012 | Lee | B32B 9/007 428/141 |
| 2012/0080209 A1* | 4/2012 | McLinn | H01B 11/1008 174/34 |
| 2012/0298396 A1* | 11/2012 | Hong | C01B 31/0446 174/107 |
| 2012/0298696 A1* | 11/2012 | Milo | G01F 11/04 222/250 |
| 2013/0008684 A1* | 1/2013 | Weitzel | H01B 13/0026 174/107 |
| 2013/0020877 A1* | 1/2013 | Miller | B60L 11/182 307/104 |
| 2014/0027150 A1* | 1/2014 | Gundel | H01B 7/0838 174/102 R |
| 2014/0140551 A1* | 5/2014 | Ramstein | H04R 17/005 381/182 |
| 2014/0364004 A1* | 12/2014 | Oniki | H01R 12/775 439/497 |
| 2015/0114472 A1* | 4/2015 | Kranbuehl | F16L 58/00 137/1 |
| 2015/0176890 A1* | 6/2015 | Spanos | F25D 31/00 62/62 |
| 2016/0062067 A1* | 3/2016 | Shimazu | G02B 6/3817 385/92 |

* cited by examiner

SECURITY CABLE

FIELD OF THE INVENTION

The present application relates to a cable (interconnect, IC) based on a graphene solution which allows a user to obtain high-quality signal. The interconnect may be the line for different types of transmission, e.g., analog, digital, RCA or XLR topology.

BACKGROUND OF THE INVENTION

In the case of audio signal transmission via cables, no part of the audio track will improve the quality of the signal (with the exception of some DSP tools, though it is a moot point anyway). The signal is only as good as the weakest element of the audio track.

Cables can be generally divided into unbalanced (instrumental—one wire in the screen) and balanced (i.e. microphone, one-two wires in the screen).

Lots of myths have been built around cables. There is no doubt, however, that each cable leading an analog signal of a music character affects the sound. This effect is even greater, the greater the length of the cable. In addition to the sound also usability is important: flexibility, mechanical strength and resistance to interference.

A cable runs under various conditions, so it is also important how it behaves at low temperatures. Internal insulation resistance to high temperature accompanying soldering plugs is significant, as poor material insulating signal cable from the screen is often a common cause of short circuits in cables.

Flexibility of a cable is achieved by the use of suitable insulating materials and signal cables made of a cord (wires twisted together). From the sound point of view, a cord sounds a bit worse than a single cable, but provides a much greater resistance to bending and twisting. Guitar cables are made from cords containing smaller quantities of wires than the balanced cable wires. That is why guitar cables have a thicker coating and a stiffer inner insulation than microphone cables. In addition, in modern guitar cables, double, or even triple shielding of signal cable is used more and more often. Beside the standard braid, conductive plastic screens are widely used.

The use of these materials allowed the reduction of the microphonics, i.e. rustling and crackling accompanying cable movement. Microphone cables, due to their more complicated construction, are typically less resistant to microphonics than guitar cables. Another thing is that microphone cables work with the sources and signal receivers with significantly lower impedance than is the case for a guitar. Cable microphonics, therefore, is here less important here, although not without significance.

Also, when connecting audio system components or home theater system or a specialized research equipment, which requires accurate parameters of signal transmission that affect the final result of measurement, appropriate interconnects are needed.

Some standards plugs are geographically limited. For example, Scart plugs are used only in Europe. Especially in video connections there is a large variety of signal transmission standards and types of connections.

In the case of a high frequency digital signal, silver plating is used to reduce the resistance. At high frequencies, it is very difficult to keep the signal within the cable because the cables are designed in a special way so that the signal flow is as easy as possible.

In the case of digital connections, important features of digital cables are both high rate of propagation as well as correct and stable impedance (Z).

In analog interconnects, low capacitance (C) is of very high importance.

Graphene G has all the properties corresponding to the requirements of the production of nanocomposite material for manufacturing a signal wire including:
- very good conduction of heat and electricity—the measured thermal conductivity is from 4840±440 to 5300±480 W/mK (as compared to, for example, silver—429 W/mK);
- low resistivity;
- very high mobility of electrons at room temperature—assuming phonons scattering only: $\mu \approx 200\,000$ cm$^2$/Vs (as compared to, for example, silicone—1500 cm$^2$/Vs, gallium arsenide—8500 cm$^2$/Vs);
- flow velocity of electrons, amounting to $\frac{1}{300}$ the speed of light, allowing for the study of the relativistic effects of electron moving in the conductor;
- one atom thick layer absorbing 2.3% of white light ($\pi\alpha$ exactly, where $\alpha$ is the fine structure constant);
- tensile strength of 130 GPa, compared to approx. 0.4 GPa for structural steel or Kevlar.

One of the most interesting features of graphene, which distinguishes it from the semiconductor, is zero energy gap, which means that it is sufficient to provide the trapped electrons in atoms with very little energy to get them into the conduction band and allow the flow of current.

Application of a suitable substrate and/or the doping of graphene help prevent scattering of electrons (which occurs for example when using a conventional substrate made of silicon oxide), and accordingly shorten the response time to changes in the external electron electromagnetic field.

Graphene, despite the thickness corresponding to only one layer of carbon atoms, is capable of very strong absorption of electromagnetic radiation in the broad range of wavelengths—particularly in the far infrared and terahertz spectrum. It is worth noting that to achieve the same degree of absorption of radiation by means of conventional materials, the thickness would have to correspond to the thickness of at least a thousand atomic layers. Such a high degree of absorption of electromagnetic radiation by graphene is the result of its unique electronic properties as a consequence of very fast-moving electrons that behave like relativistic Dirac particles with almost zero rest mass.

It is possible that graphene has the remarkable property that is called chiral superconductivity. It is superconductivity, which works only in one direction, so the flow of electricity would take place to one side without resistance, and would meet resistance flowing to the other. Chiral superconductivity interferes with T parity, so it can be used, for example, in quantum computers.

The method of making graphene chiral superconductor is known; it will demonstrate this type of property after doping.

Graphene is a very good semiconductor, electrons move very freely in it, but this freedom is dependent on the direction of the electron relative to the hexagonal grid, which carbon atoms make up. Doping graphene as other semiconductors are doped, you can give it the properties of a superconductor. Like other materials, superconductivity appears in graphene at low temperatures, but it works in a different way. Typically, low temperatures cause the vibrations of a crystal lattice and make electrons interact with each other to form Cooper pairs. They are the carriers of current in superconductors. The research shows that the structure of graphene and the differences occurring in the flow of electrons enable the formation of superconductivity even without the presence of phenomena typical for other materials. The interaction between the electrons causes the excitation of the crystal lattice in such a way that the vibrations do not propagate similarly to waves created after throwing a stone in the water, but resemble the petals of a flower, radiating from the center. The properties of these vibrations are closely linked to the direction of propagation, which means that they are chiral and superconducting properties will be recognized in one direction but not the opposite.

In the prior art there is a solution (CN 103 739 929 A, which is hereby incorporated by reference in its entirety) for the composition of the external power cable protective material, said protective material comprising a graphene uniformly dispersed in the copolymer of ethylene and vinyl acetate, in order to reduce the volume resistivity. The solution is applicable to high voltage cable insulation. The disadvantage of such solutions is that graphene is present as an addition to the main protective material—polyolefins, which reduces the conductive properties of a cable. Such cable cannot be used as a signal means or data transmission means.

The publication CN 103123830 A (hereby incorporated by reference in its entirety) discloses a layered material, wherein the graphene is "located" between the insulating and conductive material in the form of a two-dimensional monatomic or polyatomic structured layer. The insulating material proposed is polyethylene, polyvinyl chloride, etc. And the conductive material proposed is copper, aluminum, silver or gold.

According to the publication CN 103123830 A, the layered material is to be wound into a roll in order to obtain the desired effect, then one, two or more such rolls placed in a rubber tube to obtain cable for high voltages. The disadvantage of this is the use of precious metals as a conductive material which increases the cost of the production of cables as well as the necessity of rolling the roll, which is not convenient for the production of such cables and causes additional costs. The power cable known from CN 103123830 A is also not suitable as a signal cable for connecting audio, video or measurement devices.

OBJECTS AND SUMMARY OF THE INVENTION

The present invention is a signal cable for transmitting the signal between the transmitter and the receiver, comprising a first plug for connecting a transmitter signal, and a second plug intended for connection to a signal receiver electrically connected by a connecting part, characterized in that said connecting portion comprises a layer of graphene arranged on the polymer layer which graphene layer provides an electrical connection between the first plug and the second plug.

Preferably, the graphene layer disposed on the polymer layer has a round tubular shape or belt flat shape.

Preferably graphene layer is in a two-dimensional form having a thickness of one atom or more than one atom or three dimensional and most preferably they are nanotubes arranged in different directions, in particular parallel or perpendicular to the surface of the polymer.

Preferably, the graphene in the graphene layer in its pure or doped form.

Preferably, the coupling portion comprises two polymer layers between which a layer of graphene is placed.

The invention also encompasses the use of the signal cable invention to transmit the signal between the transmitter and the receiver.

BRIEF DESCRIPTION OF THE DRAWINGS

The invention will now be further described in the preferred embodiments, with reference to the accompanying drawings, in which:

FIGS. 2A through 2D illustrate the types of elastic material layers of nanocomposite signal cable in accordance with the present invention, wherein:

FIG. 2A illustrates a layer of graphene (two-dimensional or of a 3D structure e.g. nanotubes) between the two polymer layers with contact leads to the surface of one of the two polymer layers;

FIG. 2B illustrates a layer of graphene (two-dimensional or 3D structure e.g. nanotubes) "embedded" on the surface of a single layer of polymer;

FIG. 2C illustrates a doped layer of graphene (two-dimensional or of a 3D structure e.g. nanotubes) between the two polymer layers with contact leads to the surface of one of the two polymer layers;

FIG. 2D illustrates a doped layer of graphene (two-dimensional or 3D structure e.g. nanotubes) is "embedded" on the surface of a single layer of polymer.

DESCRIPTION OF EMBODIMENTS

Figure 2A:
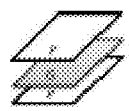

The figures use the following indications: 1—the first plug intended for connection to a signal transmitter; 2—the second plug intended for connection to a signal receiver; 3—flexible nanocomposite material of the connection portion; 4—graphene layer; 5—transmitter; 6—receiver. In FIG. 2 P is a polymer G—graphene and DG—doped graphene. In FIG. 3 the direction of signal transmission is indicated by an arrow.

Interconnects—Graphene Signal Cables

Figure 1:
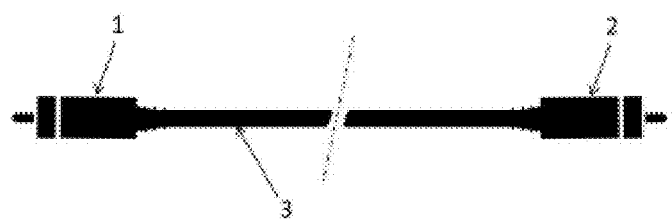
FIG. 1 illustrates the elements of a signal cable in accordance with the present invention.

Signal cables made from nanocomposite material consist of three basic elements: two plugs 1, 2, connected with a connecting part (FIG. 1). The main element of the connecting portion is flexible nanocomposite material 3.

Flexible nanocomposite material 3 is a heterogeneous material structure composed of two or more components with different properties. The properties of the composites are not the sum or average of the properties of its components, and the material used 3 in its construction exhibits anisotropy of physical properties.

Referring to FIG. 2, one component of the nanocomposite material 3 is any polymer substrate, serving as an adhesive that ensures its integrity, hardness, flexibility and resistance to compression, and the other is the graphene layer 4, which provides conductive properties.

Nanocomposite material structure 3 of the interconnects takes into account:

applying more layers of graphene in the material—the number of coats of mononuclear is dependent on the required parameters of interconnects.

the use of graphene in the form of nanotubes, if the use of the properties of graphene, which is given by such construction are necessary to increase the effectiveness of the interconnects.

graphene doping in order to obtain the material properties necessary to manufacture interconnects characterized by the best parameters.

The properties of graphene meet the conditions to create a nanocomposite material, which is the major component of the interconnects. One should, however, take into account manufacturing of interconnects of the nanocomposite material with nanostructures with properties similar to graphene.

Figure 2B:
Figure 2C:
Figure 2D:
Figure 3:
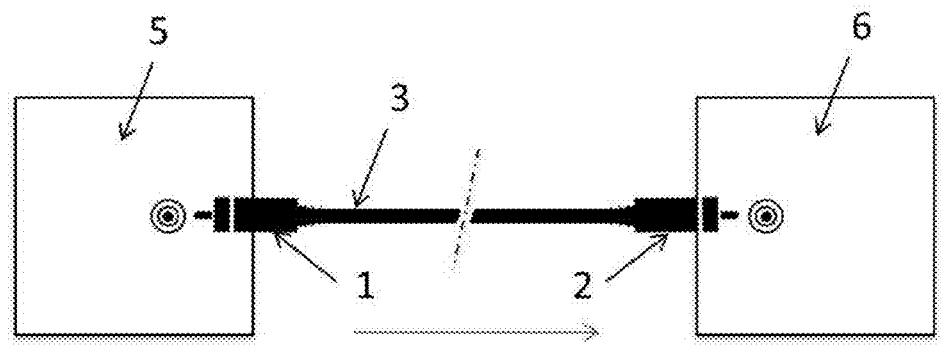
FIG. 3 illustrates the principle of operation of a signal cable in accordance with the present invention.

Referring to FIGS. 2A through 2D, signal cable of nanocomposite material layer 3 can be made in one of the following ways:

a layer of graphene (G) (two-dimensional or 3D structure e.g. nanotubes) "embedded" on the surface of a single layer of polymer (P) (FIG. 2B);

a layer of graphene (G) (two-dimensional or of a structure e.g. nanotubes) between the two polymer layers with contact leads to the surface of one of the two polymer layers (P) (FIG. 2A);

a doped layer of graphene (DG) (two-dimensional or of a structure e.g. nanotubes) exists between the two polymer layers (P) with contact leads to the surface of one of the two polymer layers (FIG. 2C);

a doped layer of graphene (DG) (two-dimensional or of a structure e.g. nanotubes) "embedded" on the surface of a single layer of polymer (P) (FIG. 2D).

Use of graphene interconnects provides for the application of different plugs, depending on the standards used in different geographic areas.

The length of the graphene interconnects is not limited by technical requirements, but only user's needs.

The Principle of Operation of Graphene Interconnects

In general, interconnects are used for signal transmission, which is the process of transferring any messages or data between the transmitter (sender) and the receiver (the receiver), recorded in a specific code understood by both, and over a certain route.

Signal source can be any measurable size changing in time, generated by natural phenomena or systems and converted into electricity. As all phenomena, the signal can be described using a mathematical apparatus, e.g. by entering a time-dependent function. We say that a signal carries information or allows the flow of information.

Referring to FIG. 3, when the transmitter 5 is connected to the receiver 6 by means of terminals 1, 2 suitable for the devices (transmitter and receiver), and starting of the transmitter 5, the signal is transmitted via the interconnect 3 to the receiver 6 (FIG. 3).

Depending on the design, the arrangement of graphene nanocomposite structure may take any form that can achieve maximum performance of the interface during its use.

Figure 4:
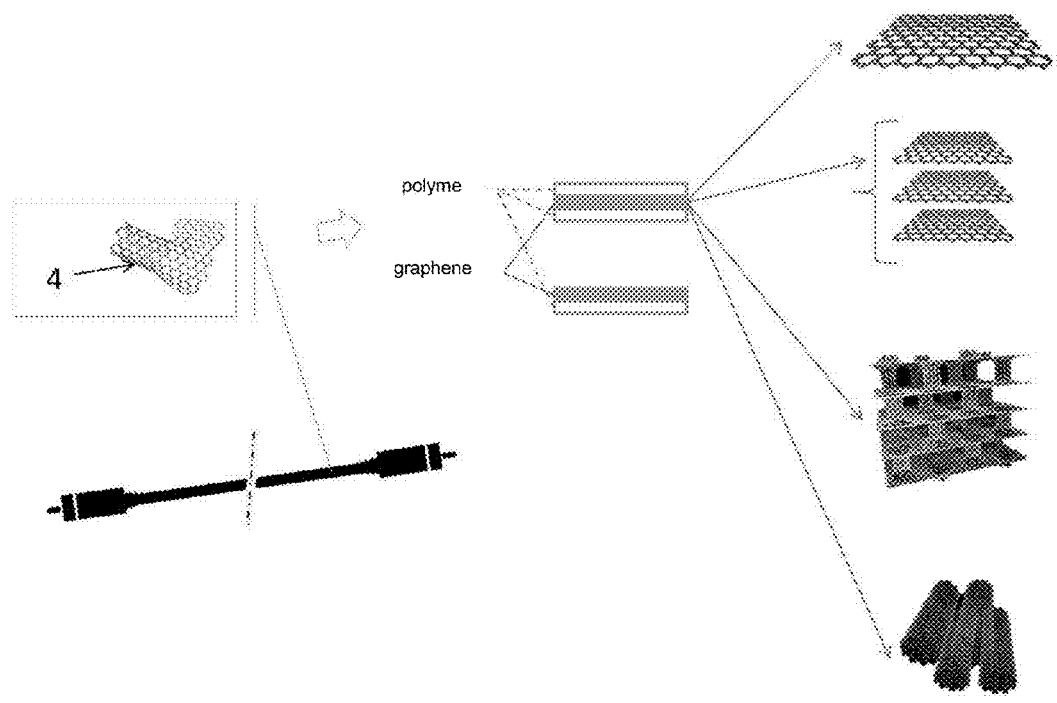
FIG. 4 illustrates the examples of the arrangement of conductive structures in the nanocomposite material of a signal cable in accordance with the present invention.
Figure 5:
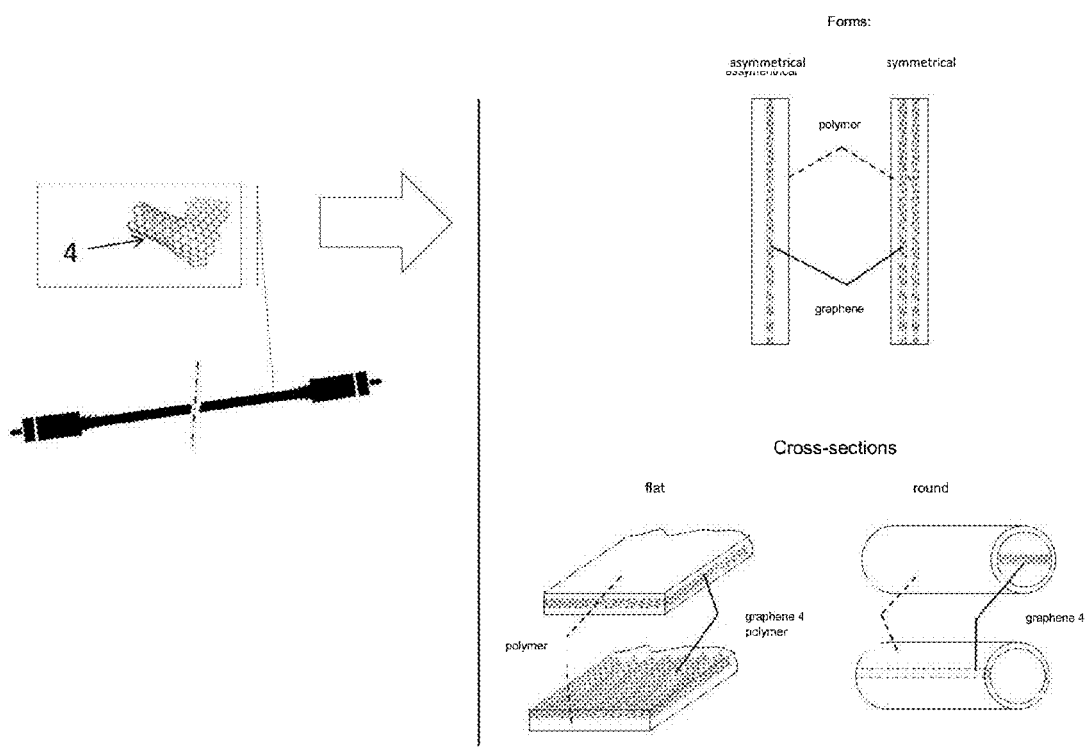
FIG. 5 illustrates forms and cross-sections of graphene signal cables in accordance with the present invention.

Referring to FIGS. 4 and 5, graphene interconnects, as regards the formation of the graphene layer 4 disposed on the polymer layer, can be symmetrical or asymmetrical, with flat or round cross-section. The method of laying the conductive graphene layer 4 is not mandatory, but dependent on the technical requirements for connecting the receiver 5 to the transmitter 6 (FIG. 5). The graphene layer 3 must be electrically connected to both plugs 1 and 2.

Advantages of this Invention

Signal cables made from the nanocomposite material are resistant to:
moisture and condensation
splashing
water-damage
corrosion
ultraviolet
dust
changes in the magnetic and the electromagnetic field
changes in temperature in the range −40° C. to +70° C. ensuring accurate transmitter output signal at the receiver input.

The invention can be used both in commercial equipment, as well as in specialized research equipment that requires high performance signal transmission, affecting the final result of the measurement.

The invention claimed is:

1. A signal cable for transmitting the signal between a transmitter and a receiver, comprising:
    a first plug intended for connection to a signal transmitter;
    a second plug intended for connection to a signal receiver;
    a connecting portion electrically connecting said first plug with said second plug;
    wherein said connecting portion is formed from a rolled laminate sheet and includes a graphene layer sandwiched between two polymer layers, said graphene layer having a thickness of one atom;
    wherein said graphene layer is electrically connected to said first plug and said second plug.

2. The signal cable of claim 1, wherein said graphene in said graphene layer is in pure or doped form.

3. Use of a signal cable according to claim 1 for signal transfer between the transmitter and the receiver.

* * * * *